H. B. ANDERSON.
FASTENING DEVICE.
APPLICATION FILED MAY 7, 1914.
1,127,574.
Patented Feb. 9, 1915.
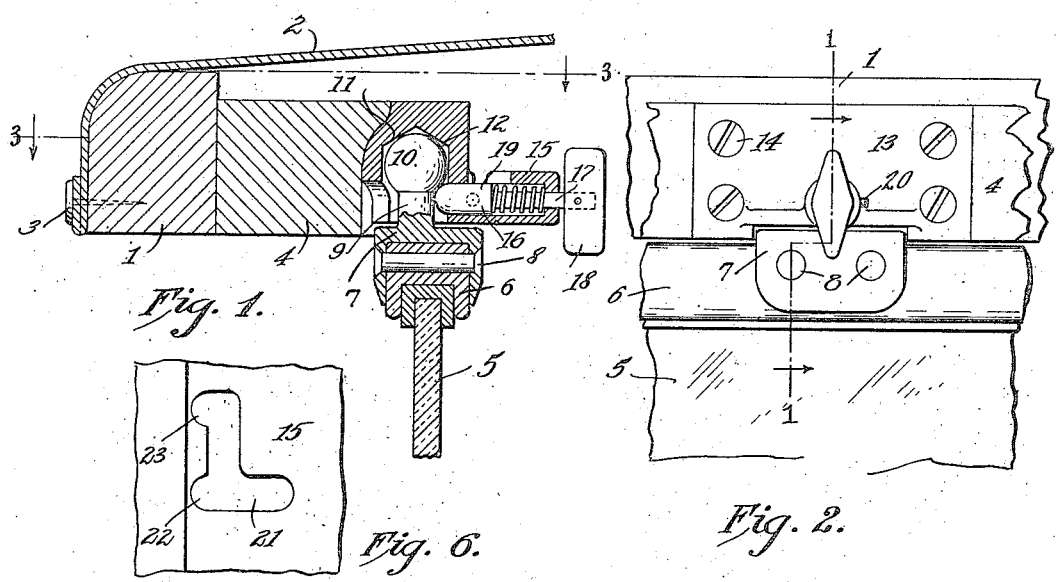
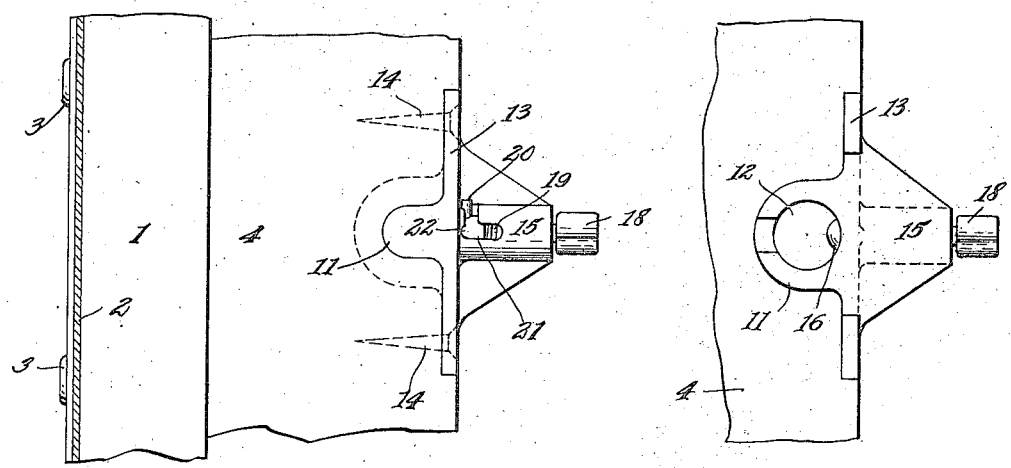
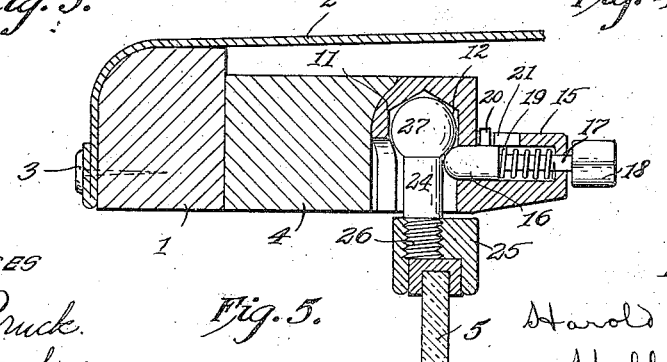
WITNESSES
R. L. Bruck
O. M. Kappler
INVENTOR,
Harold B. Anderson
Hull and Smith
By
ATT'YS

UNITED STATES PATENT OFFICE.

HAROLD B. ANDERSON, OF CLEVELAND, OHIO, ASSIGNOR TO THE WINTON MOTOR CARRIAGE COMPANY, OF CLEVELAND, OHIO, A CORPORATION OF OHIO.

FASTENING DEVICE.

1,127,574.

Specification of Letters Patent.

Patented Feb. 9, 1915.

Application filed May 7, 1914. Serial No. 836,947.

*To all whom it may concern:*

Be it known that I, HAROLD B. ANDERSON, a citizen of the United States, residing at Cleveland, in the county of Cuyahoga and State of Ohio, have invented a certain new and useful Improvement in Fastening Devices, of which the following is a full, clear, and exact description, reference being had to the accompanying drawings.

This invention relates to devices for separably connecting the front ends of automobile tops to the upper edges of wind-shields whereby the tops are effectually held in extended position. Top straps have been used heretofore for this purpose, but they are unsightly, as well as inconvenient of use.

While the device of my invention is applicable to practically any style of the folding type of automobile tops, it is especially designed for use in connection with those tops known to the trade as the "one-man" tops, or those which can be extended or folded by one person.

The invention has for its general object to provide a device of the above nature which is composed of two interlocking members that are capable of easy connection and separation, one of which is adapted to be carried by the wind-shield of an automobile, and the other by the top.

The invention further provides means whereby the members may be positively locked against separation, which means may be readily actuated from within the automobile for rendering said means effective or ineffective; and notwithstanding the fact that the members may be positively locked against separation, a free and easy universal movement is permitted between them to compensate for the relative movement between the wind-shield and the top, thereby relieving the screws that hold the members in place, from undue strain.

In the accompanying drawings, Figure 1 represents a vertical section through my fastening device and includes a portion of the automobile wind shield and a part of the automobile top, the section being taken approximately on the line 1—1 of Fig. 2; Fig. 2 is a rear elevation of what is shown in Fig. 1; Fig. 3 is a sectional plan taken on the line 3—3 of Fig. 1; Fig. 4 is a bottom plan view of that member of the fastening device which is carried by the automobile top; Fig. 5 is a view, similar to Fig. 1, of a modified form of the invention; and Fig. 6 is a detail common to both forms.

Describing the invention by the use of reference characters, 1 represents the front bow of an automobile top and 2 the cover which is attached thereto by the tacks 3. Secured to the rear side of the front bow 1 is a trip 4 which extends rearwardly over the top of the wind shield 5, the underneath surface of the strip 4 being spaced a slight distance above the upper surface of the wind shield frame 6, as clearly shown in Fig. 2. That member of my fastening device which is carried by the wind shield comprises a base 7 which is of channel formation and which is adapted to be placed down over the top of the wind shield frame and secured thereto by rivets 8. Rising from the base 7 is a neck 9 that carries a spherical head 10 at its upper end; the diameter of the neck being considerably less than that of the head. The rear side of the strip 4 is notched for the reception of the other member of my fastening device, and this member is composed of a body portion 11 which has a socket 12 for the reception of the head 10. A plate 13 is formed integral with the body portion 11 and is set into the rear surface of the strip 4 where it is securely held by the screws 14. Extending rearwardly from the plate 13 is a hollow, cylindrical boss 15 which contains a plunger 16 that has a shank 17 that extends rearwardly through an aperture in the end of the boss 15, where it is provided with a button 18 whereby the plunger may be rotated. A spring 19 is interposed between the rear end of the plunger 16 and the opposed surface of the boss 15, and to push the plunger 16 forwardly into engagement with the neck 9; and the proportions of the parts are such as will cause the plunger 16 to engage the neck just below the head 10 when the upper surface of the head is in contact with the top wall of the socket 12. A pin 20 projects from one side of the plunger 16 through a slot 21 in the boss 15. From the development of the slot 21, which is shown in Fig. 6, it will be seen that the slot is substantially L shaped.

and that one of the branches of the slot is parallel to the longitudinal axis of the boss 15. This branch of the slot is formed, preferably, in the top wall of the boss 15. The other branch of the slot 21 extends at substantially right angles from the side of the former branch and embraces about ninety degrees of the circumference of the boss 15. It will be seen that the transverse branch of the slot extends from the side of the longitudinal branch a little to the rear of its forward end, whereby a pocket 22 is formed; and a similar pocket 23 is formed at the outer end of the transverse branch. The purpose of the pockets 22 and 23 will be brought out in the description of the operation of the device.

It will be stated at this time that two of my locking devices are used in connection with an automobile wind shield and top, one being located near each end of the wind shield. Now, assuming that the parts are in the position shown in the drawing, it will be seen that the top cannot be raised because of the engagement of the head 10 with the forward end of the plunger 16, and that the plunger 16 is not permitted to move a sufficient distance to allow the head 10 to pass its protruding end because of the engagement of the pin 20 with the rear side of the transverse branch of the slot 21. In order to disconnect the parts, it is necessary to turn the button 18 until the pin 20 has been removed from the pockets 23 and brought into the pocket 22 that is formed by the front end of the longitudinal branch of the slot 21. With nothing to obstruct the rearward movement of the pin 20, the head 10 may ride over the end of the plunger 16, pressing the plunger inward against the tension of the spring 19, a sufficient distance to permit of such action. Ordinarily the spring 19 acts to retain the pin 20 in one or the other of the pockets 22 or 23 so that the plunger 16 will not become turned by the jarring of the automobile.

It has been mentioned hereinbefore that a universal movement is permitted between the members of the locking device. This is obvious from an inspection of Figs. 1 to 5 wherein it will be seen that the two members form, in effect, a ball-and-socket joint, the plunger 16 being effected in no way by a forward or sidewise oscillation of the neck 9, and yielding enough to permit of a rearward swinging thereof.

In the modification shown in Fig. 5, it will be seen that a stud 24 has been substituted for the neck 9 of the previous form. This provides a very simple construction and is preferable when the frame of the wind-shield is made especially thick, as the one shown at 25, in Fig. 5, for the purpose of receiving the threaded end 26 of the stud 24. The upper end of the stud 24 is provided with a head 27. In practically all other respects, this modified form of my invention is the same as that shown in Figs. 1 to 4, and I therefore apply the same reference characters to the corresponding parts of the two forms.

Having thus described my invention, what I claim is:—

1. In a device of the character set forth comprising a socketed member having a guideway at substantially right angles to the axis of the socket, an entering member that is adapted to be received by the socket and consisting of a neck and a spherical head carried thereby which is capable of oscillation with respect to the socket, a plunger within the aforesaid guideway that is arranged to be projected into the socket in a position to be engaged by the head of the entering member, and means for preventing the retraction of said plunger.

2. A device of the character set forth comprising a member having a socket and a bore that extends at substantially right angles therefrom, the side wall of the bore having a substantially L-shaped slot, an entering member that is adapted to be received by the socket and consisting of a neck and a substantially spherical head carried thereby which is capable of oscillation within the socket, a plunger within the aforesaid bore of the receiving member, a spring that acts to force the plunger toward the neck of the entering member, and a pin that projects from the side of the plunger into the aforesaid L-shaped slot which, when occupying one branch of said slot locks said plunger against retraction.

3. A device of the character set forth comprising a member having a socket and a bore that extends therefrom at substantially right angles, the side wall of the bore having a substantially L-shaped slot, an entering member that is adapted to be received by the socket and consisting of a neck and a substantially spherical head carried thereby which is capable of oscillation within the socket, a plunger within the aforesaid bore of the receiving member, a spring that acts to force the plunger toward the neck of the entering member, a pin that projects from the side of the plunger into the aforesaid L-shaped slot which, when occupying one branch of said slot locks said plunger against retraction, and means for turning the plunger.

4. A device of the character set forth comprising a receiving member having a socket and a bore that extends therefrom at substantially right angles, an entering member that consists of a neck and a substantially spherical head carried thereby that is adapted to be received by the socket, a plunger within the aforesaid bore that is arranged to be projected into the socket in a position to be engaged by the head of the entering member, a spring within the bore that acts to force the plunger toward the entering member, and means locking the plunger against retraction.

In testimony whereof, I hereunto affix my signature in the presence of two witnesses.

HAROLD B. ANDERSON.

Witnesses:
W. A. WALKERMYERS,
O. M. WHITTERBERGER.